July 4, 1950             J. D. KILLOUGH             2,513,491

CALCULATOR

Filed March 14, 1946

J. D. KILLOUGH
INVENTOR.

BY J. Vincent Martin
and
Ralph R. Browning
ATTORNEY

Patented July 4, 1950

2,513,491

UNITED STATES PATENT OFFICE 2,513,491

CALCULATOR

James D. Killough, Shreveport, La.

Application March 14, 1946, Serial No. 654,349

2 Claims. (Cl. 235—89)

This invention relates to slide type calculators and refers more particularly to calculators adaptable for use in determining pressures and flow rates or volumes per unit of time in transmission lines, such as pipe lines, electrical conductors, etc., made up of separate sections which may have different flow characteristics.

The device may be used to avoid the necessity of making rather involved calculations from time to time with respect to capacity and pressures within a given section of a transmission line used for conducting gas, oil or other fluids and may also be used in calculating similar values for other forms of conductors for fluid or quasi-fluid substances. For example, it is useful for making calculations with respect to current carrying capacity, voltage, etc. in an electrical transmission line. For the purpose of convenience this description will be limited to the application of this invention to pipe line problems.

An object of this invention is to provide a device by which the pressures or voltages and rate of flow or volume per unit of time at a given point of a transmission line for given operating conditions may be readily obtained.

Another object is to provide a device by means of which the upstream pressure in a pipe line required to effect a predetermined downstream pressure and volume per unit of time therein may be determined.

A further object is to provide a device by means of which the downstream pressure of a pipe line to be expected under given upstream pressure and volume conditions for said line may be determined.

Still another object is to provide a device by which the Weymouth volume, at any given point of a pipe line, may be determined when the point is between two points at which the pressures are known and between which the volume or flow rate is constant.

Other and further objects of this invention will appear from the following description.

Figure 1:
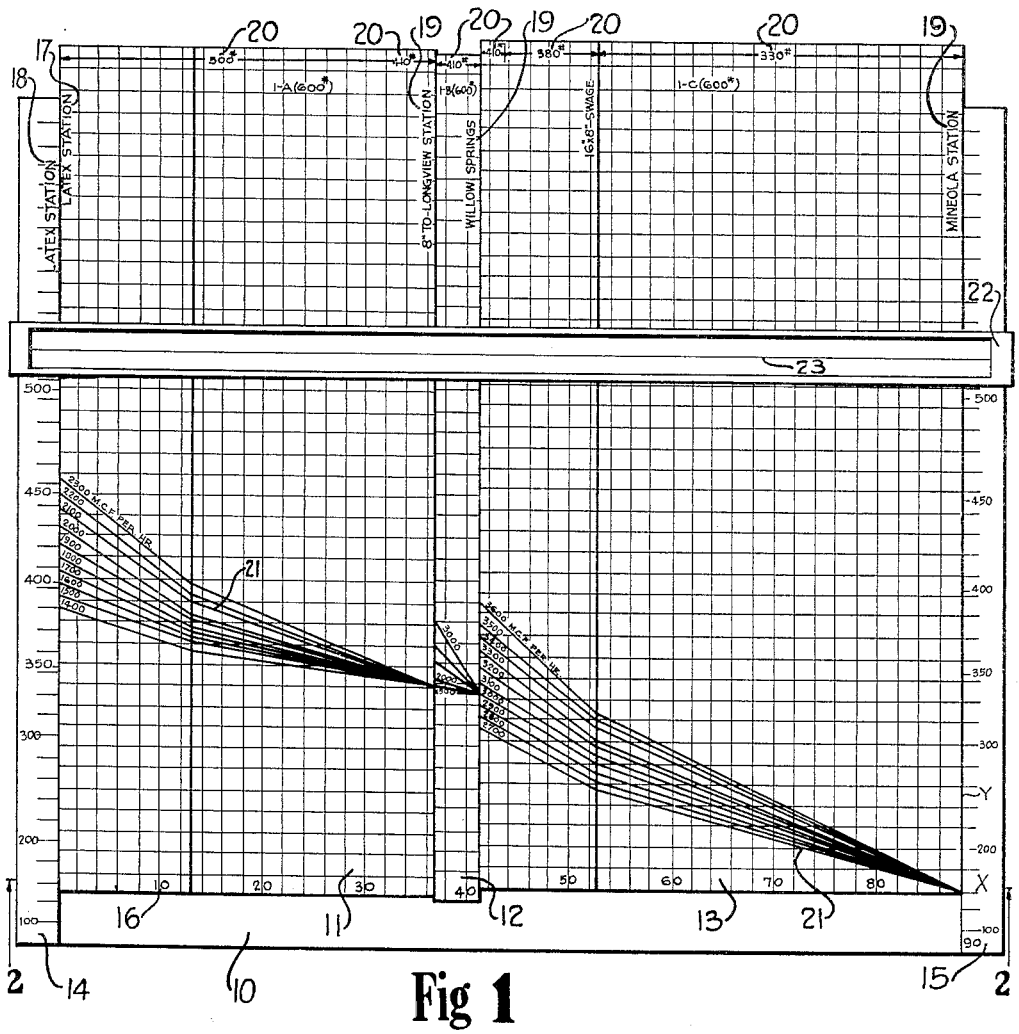
Figure 2:

In the accompanying drawings, which form a part of the instant specification and are to be read in conjunction therewith and wherein like reference numerals are used to indicate like parts in the various views, Fig. 1 is a top plan view of an embodiment of this invention, and Fig. 2 is a transverse sectional view taken along the line 2—2 in Fig. 1 in the direction of the arrows.

Referring to the drawings a base or table 10, having a wide groove in its upper face, is adapted to slidably receive a plurality of panels or slide sections such as 11, 12 and 13. These panels have an interlocking engagement as shown in Fig. 2, which permits sliding movement of the panels.

Along the edges of table 10 are pressure scales 14 and 15, the calibrations of which are in exact alignment. While it is contemplated that only one pressure scale may be used, reading of pressures at various points over the panels is usually facilitated by the use of two or more scales. The pressure range indicated on these scales should include the working pressure range of the pipe line in conjunction with which this calculator is to be used.

In the embodiment shown in the drawing the pressure scales are fixed and are integral with the base 10. However it is to be understood that a drawing board or other like flat object may be utilized as a base with provisions for fastening the pressure scales in any given fixed position to accommodate each particular set of panels corresponding to different pipe line systems. In this case, the pressure scales are adjustably mounted for movement toward or away from each other to facilitate assembly of the device. However, when the calculator is assembled, the pressure scales remain fixed during operation.

Coming now to the indicia shown on the panels it is seen that along the lower edge of the panels the mile lines or points along the pipe line are indicated as at 16. The name of the upstream station is printed on both the panel 11 and pressure scale 14 at 17 and 18 respectively. The names of other stations along the pipe line and other suitable information such as pipe size appears on the panels as at 19. The maximum working pressure of each section of pipe line is preferably written at the top of each panel as at 20. Each panel has a series of curves 21 plotted thereon according to the Weymouth formula for a given rate of flow; the rate of flow or volume per unit of time which each curve represents is indicated in M. C. F. per hour (M. C. F. stands for 1,000 cubic feet). For gas this volume is usually calculated at 8 oz. with 14.4 lbs. base, but may be any selected pressure. As shown in Fig. 1, these lines or curves 21 on each panel are arranged to converge at a point on one side of the panel in the direction in which gas is flowing, herein shown as the right side, and such points of convergence are utilized as indicators in positioning adjacent panels for calculations, as hereinafter described.

A cross slide 22 is provided. To facilitate the reading of pressures at points along the curves intermediate the pressure scales this cross slide is provided with the usual hair line 23.

To assemble a calculator to be used in conjunction with a particular pipe line or part thereof between selected points or stations along the line, panels are selected representative of each section of the line between division points, booster stations, gathering stations or the like. In other words each panel represents the portions of the line between points at which gas may be either added to or withdrawn from the line. The curves 21 on each panel are drawn to represent the various portions or sections of the pipe. The straight portions of each curve represent pipe sections of uniform characteristics. Each panel is separately slidable in a line parallel to the pressure scales.

In operation the calculator may be used to quickly obtain certain information regarding the rate of flow or pressure at various points along the pipe line for particular conditions.

In describing the operation of the calculator, examples of the operations for which the device is suited will be taken up in the order indicated below:

*Case I.*—Find downstream pressure where upstream pressure and volumes are known.

*Case II.*—Find upstream pressure where downstream pressure and volumes are known.

*Case III.*—Determine the Weymouth volume between two points where the upstream and downstream pressures are known, and there are no volume changes in between.

A. Downstream pressure is at a volume line converging point on a panel.

B. Downstream pressure is at a location other than that where the volume lines converge at the edge of the panel.

As an example of Case I, consider that it is desired to make a Weymouth calculation as follows:

Determine the downstream pressure at Mineola Station when the Latex pressure is 400# per square inch with a delivery rate of 1600 MCF per hour at the Latex Station. Where the volume between the Longview Station and Willow Springs is 1500 MCF per hour and the delivery to Mineola is 3,000 MCF per hour.

It is apparent then that 100 MCF per hour of gas will have to be withdrawn from the line at the Longview Station and that 1500 MCF per hour of gas will have to be introduced to the line at the Willow Springs Station.

*Procedure.*—Set panel 11 so that the left end of the curve marked 1600 coincides with the point on the pressure scale 14 marked 400. Panel 12 is then set so that the left end of the curve marked 1500 coincides with the point of convergence of the curves on panel 11. Panel 13 is then slid into the position so the left end of the curve marked 3,000 coincides with the point of convergence of the curves on panel 12. The pressure then, that the gas will be received at the Mineola Station, is read upon scale 15 opposite the point of convergence of the panel 13 curves. It is seen that this pressure indicated at X, is approximately 150# per square inch.

The pressure at which the 100 MCF per hour of gas is removed at the Longview Station may be determined by lowering cross slide 22 so that the cross hair intersects the point of convergence of the panel 11 curves. The cross hair is then read on either pressure scale to give the pressure. The pressure at which the 1500 MCF per hour gas must be introduced into the line at Willow Springs may be determined in a similar fashion.

With reference to Case II, the example of Case I will be reversed to determine the upstream pressure at Latex Station with 150# per square inch pressure at the Mineola Station with the volume conditions as given in Case I.

*Procedure.*—The converging point of panel 13 curves is set at 150# per square inch on the right hand pressure scales. The convergence point of panel 12 curves is set at the left end of the curves marked 3,000 on panel 13. The convergence point of the panel 11 curves is then set opposite the left end of the curve marked 1500 on panel 12. The pressure at the Latex Station under which the gas must be introduced into the pipe line is then read opposite the left end of the curve marked 1600 on panel 11. This pressure is approximately 400# per square inch.

It is often desirable to know the pressure at a certain point of the line where for instance the maximum working pressure may be unusually low. Referring to panel 13 it is seen that the maximum working pressure along the pipe line from the swage to Mineola Station is 330#. The operator where the pressures and volumes are the same as in Case II would then desire to check the pressure existent at the swage or along approximately the 53 mile line. To make this check the cross slide 22 is moved downwardly until the cross hair 23 intersects the Weymouth volume curve marked 3,000 on panel 13 at the heavy line indicating the swage. The pressure may then be read on either of the pressure scales 14 or 15 by noting the intersection of the cross hair therewith. In this instance the pressure is somewhat below 300# and is well within the operating range of the pipe line.

Coming now to Case III, the operation of the calculator will be described when it is desired to determine the Weymouth volume between two points at which the upstream and downstream pressures are known and there are no volume changes in between. Taking up Case III A first, it will be assumed that the pressure and volume conditions are the same as in Case I and that the pressures at Mineola Station is known as 150# and that the pressure at the 60 mile marker is known and is such as that indcated at Y on the pressure scale 15. Then to determine the volume between these points the converging point of the panel 13 curves is placed opposite the point X on pressure scale 15 and the cross slide is lowered until the hair line coincides with the point Y on pressure scale 15. At the intersection of the hair line and the mile line 60 the volume line identified by the numeral 3,000 also intersects the hair line and line 60 at this point. Thus it is determined that the volume between the known points is 3,000 MCF per hour. If there is no volume curve at this point then the volume is estimated according to the position of the hair line relative to the closest curves.

With respect to Case III–B where the downstream pressure is at a location on a panel other than that where the volume lines converge the hair line is set across the two scales at the upstream pressure. The volume panel involved is then moved so that one of the volume lines crosses the hair line at the point or mile pole where the upstream pressure is known. Then the hair line is lowered until it coincides with the intersection of the same volume line selected above and the point or mile pole where the downstream pressure is known. The pressure value is then read on either of the pressure scales. If this is the known downstream pressure the volume line used is correct. However, if the scale reading is not this value then a different curve is selected and the procedure repeated until the proper curve of the scope is found or the correct value can be determined to lie between two values or curves in which case it is necessary to approximate the actual volume.

Nearly all the usual Weymouth calculations encountered in actual practice are covered by the cases explained above. However, the pipe line systems frequently do not operate with the volume pressure drop relationship predicted by Weymouth's flow formula. When this is found to be the case for a certain line the operation of the line may be expressed as a certain percentage of Weymouth's. The ratio of the actual volume to the predicted volume times 100 gives this percentage:

$$\frac{\text{Actual volume}}{\text{Weymouth's volume}} \times 100 =$$

Percentage of Weymouth's

The percentage of Weymouth's is also equal to the ratio of the square roots of the difference of the squares (using absolute pressures) of the calculated to the actual pressures. As an example, a case will be considered for a pipe line passing 6,300 MCF per hour between two points where the upstream pressure is 300# and the downstream pressure is 264#. For this volume of upstream presure the calculator will be presumed to give a downstream pressure reading of 260#. All three of these guage pressures can be made absolute by adding 14.4# thereto (approximate atmospheric pressure). Then the squares of the absolute pressures would be:

For 300#, 314.4 squared or 98,847
For 264#, 278.4 squared or 77,507
For 260#, 274.4 squared or 75,295

To facilitate obtaining these values square root tables may be provided with the calculator.

The difference of the squares of the absolute pressures for the calculated Weymouth's formula pressures of 300# and 260# would be:

98,847 minus 75,295 or 23,552 and for the actual pressures of 300# and 264# it would be:

98,847 minus 77,507 or 21,340

Since the percentage of Weymouth's is the square root of the Weymouth pressure difference divided by the square root of the actual pressure difference multiplied by 100, the value may be expressed.

$$\frac{\text{The square root of 23,552}}{\text{The square root of 21,340}} =$$

Square root of $1.103 = 1.05 \times 100$ or $105\%$

In operation the value obtained by use of the calculator may be multiplied by the percentage Weymouth's for the particular pipe line to determine the actual value.

In the specification and claims the term pressure as used includes electrical pressures or potential as well as fluid pressures as the case may be, and rate of flow likewise includes electrical current flow.

It will be seen that the objects of this invention have been accomplished. There has been provided a calculator by which the pressures and rate of flow at any selected point of a pipe line under given operating conditions may be readily obtained. The arrangement is such that various problems arising in pipe line operation relating to volume and pressure of the line may be quickly solved. The construction provides devices by means of which the pressures existent at various points of the line may be determined to check whether these pressures fall within the maximum working range of that portion of the line.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described the invention, what is claimed is:

1. A calculating device for use in determining pressures and flow rates of fluids in a pipe line composed of sections having different flow characteristics and having inlets and outlets between its terminals, comprising a base, a pressure scale fixed adjacent one side of the base, a set of panels slidably carried by the base and corresponding in number and widths to the number and lengths of pipe sections between inlets and outlets in the pipe line portion being computed, each panel bearing indicia including a series of lines which converge at a point on one side of the panel, said convergence point on a panel forming an indicator for positioning the adjacent panel on that side for calculations, and a cross slide movably mounted over all said panels and pressure scale.

2. A calculating device for use in determining pressures and flow rates of fluids in a pipe line composed of sections having different flow characteristics and having inlets and outlets between its terminals, comprising a base, a pressure scale fixed adjacent one side of the base, a set of panels slidably carried by the base and corresponding in number and widths to the number and lengths of pipe sections between inlets and outlets in the pipe line portion being computed, each panel bearing indicia including a series of lines which converge at a point on one side of the panel in the direction in which fluid is flowing in the pipe line, said convergence point on a panel forming an indicator for positioning the adjacent panel on that side for calculations, and a cross slide movably mounted over all said panels and pressure scale.

JAMES D. KILLOUGH.

REFERENCES CITED

The following references are of record in the file of this patent:

UNITED STATES PATENTS

| Number | Name | Date |
|---|---|---|
| 1,383,492 | Seely | July 5, 1921 |
| 1,475,999 | Jaray | Dec. 4, 1923 |
| 1,486,082 | Fowler | Mar. 4, 1924 |
| 2,034,189 | Hogan | Mar. 17, 1936 |
| 2,277,993 | Preston | Mar. 31, 1942 |